(12) United States Patent
Aycock

(10) Patent No.: US 9,322,568 B2
(45) Date of Patent: Apr. 26, 2016

(54) WHOLE HOUSE VENTILATION SYSTEM

(75) Inventor: James L. Aycock, Kinston, NC (US)

(73) Assignee: FIELD CONTROLS, LLC, Kinston, NC (US)

( * ) Notice: Subject to any disclaimer, the term of this patent is extended or adjusted under 35 U.S.C. 154(b) by 0 days.

(21) Appl. No.: 13/321,611

(22) PCT Filed: Oct. 7, 2011

(86) PCT No.: PCT/US2011/055204
§ 371 (c)(1),
(2), (4) Date: Nov. 21, 2011

(87) PCT Pub. No.: WO2012/048184
PCT Pub. Date: Apr. 12, 2012

(65) Prior Publication Data
US 2013/0180700 A1 Jul. 18, 2013

Related U.S. Application Data

(60) Provisional application No. 61/390,721, filed on Oct. 7, 2010.

(51) Int. Cl.
*F25B 29/00* (2006.01)
*F24F 11/02* (2006.01)
(Continued)

(52) U.S. Cl.
CPC ............... *F24F 11/022* (2013.01); *F24F 7/08* (2013.01); *F24F 11/0001* (2013.01); *F24F 11/0079* (2013.01); *F24F 13/1426* (2013.01); *F24F 2011/0002* (2013.01); *Y02B 30/746* (2013.01)

(58) Field of Classification Search
CPC .............. F24F 3/044; F24F 3/00; F24F 7/08; F24F 13/1426; F24F 2011/0002; F24D 3/14; F24D 4/04; Y02B 30/746

USPC ......... 165/248, 249, 252, 267, 270, 279, 286, 165/59, 54; 454/238, 239, 252, 265, 333, 454/338, 255, 256, 340, 341, 347, 9
See application file for complete search history.

(56) References Cited

U.S. PATENT DOCUMENTS 2,224,946 A 12/1940 Appel
3,949,809 A 4/1976 Gilles
(Continued)

FOREIGN PATENT DOCUMENTS

CA 2 245 135 8/2001
JP 07-332737 12/1995
(Continued)

OTHER PUBLICATIONS

International Preliminary Report on Patentability for PCT/US2011/055204 mailed Apr. 18, 2013, 7 pgs.

*Primary Examiner* — Travis Ruby
(74) *Attorney, Agent, or Firm* — Brinks Gilson & Lione

(57) ABSTRACT

A control system is disclosed for a house HVAC system including a thermostat, supply and return air plenums and an HVAC fan. The thermostat selectively controls the HVAC system to maintain the desired temperature and resulting in a variable operating cycle period between successive on times. A fresh air intake duct is between an exterior intake vent and the return air plenum. A stale air exhaust duct is between the return air plenum and an exterior exhaust vent. The control system comprises a controllable intake damper in the fresh air intake duct and a controllable exhaust damper in the stale air exhaust duct. A controller is operatively connected to the house HVAC fan and the controllable dampers. The controller predicts an upcoming cycle period for a next successive operating cycle and calculates a fresh air vent time.

22 Claims, 18 Drawing Sheets

(51) Int. Cl.
   *F24F 11/00*   (2006.01)
   *F24F 7/08*   (2006.01)
   *F24F 13/14*   (2006.01)

(56) References Cited

U.S. PATENT DOCUMENTS

| | | | |
|---|---|---|---|
| 4,136,730 A | 1/1979 | Kinsey | |
| 4,369,916 A * | 1/1983 | Abbey | 236/11 |
| 4,437,608 A | 3/1984 | Smith | |
| 4,718,021 A * | 1/1988 | Timblin | 700/277 |
| 4,735,130 A | 4/1988 | Seppamaki | |
| 4,838,482 A | 6/1989 | Vogelzang | |
| 5,131,887 A | 7/1992 | Traudt | |
| 5,179,998 A | 1/1993 | Des Champs | |
| 5,230,466 A | 7/1993 | Moriya et al. | |
| 5,385,505 A | 1/1995 | Sharp et al. | |
| 5,544,645 A | 8/1996 | Armijo et al. | |
| 5,547,017 A | 8/1996 | Rudd | |
| 5,582,233 A | 12/1996 | Noto | |
| 5,597,354 A | 1/1997 | Janu et al. | |
| 5,722,483 A | 3/1998 | Gibson | |
| 5,722,887 A | 3/1998 | Wolfson et al. | |
| 5,881,806 A | 3/1999 | Rudd | |
| D409,073 S | 5/1999 | Bluestone | |
| 6,035,849 A | 3/2000 | Bluestone | |
| 6,126,540 A | 10/2000 | Janu et al. | |
| 6,252,689 B1 | 6/2001 | Sharp | |
| 6,425,297 B1 | 7/2002 | Sharp | |
| 6,431,268 B1 | 8/2002 | Rudd | |
| 6,481,676 B1 | 11/2002 | Bluestone | |
| 6,514,138 B2 | 2/2003 | Estepp | |
| 6,619,063 B1 | 9/2003 | Brumett | |
| 6,629,886 B1 | 10/2003 | Estepp | |
| 6,698,219 B2 | 3/2004 | Sekhar et al. | |
| 6,742,516 B2 | 6/2004 | McCarren | |
| 6,749,125 B1 | 6/2004 | Carson et al. | |
| 6,755,138 B2 | 6/2004 | McCarren | |
| 6,779,735 B1 | 8/2004 | Onstott | |
| 6,860,430 B2 | 3/2005 | Sanchez | |
| 6,889,750 B2 | 5/2005 | Lagace et al. | |
| 6,983,889 B2 | 1/2006 | Alles | |
| 6,988,671 B2 | 1/2006 | DeLuca | |
| 6,997,390 B2 | 2/2006 | Alles | |
| 7,007,740 B2 | 3/2006 | Grinbergs et al. | |
| 7,044,397 B2 | 5/2006 | Bartlett et al. | |
| 7,059,400 B2 | 6/2006 | Sekhar et al. | |
| 7,174,482 B2 | 2/2007 | Voleti et al. | |
| 7,188,779 B2 | 3/2007 | Alles | |
| 7,216,556 B2 | 5/2007 | Desrochers et al. | |
| 7,222,494 B2 | 5/2007 | Peterson et al. | |
| 7,225,995 B2 | 6/2007 | Sanchez | |
| 7,258,280 B2 | 8/2007 | Wolfson | |
| 7,302,313 B2 | 11/2007 | Sharp et al. | |
| 7,331,852 B2 | 2/2008 | Ezell et al. | |
| 7,360,461 B2 | 4/2008 | Desrochers et al. | |
| 7,389,158 B2 | 6/2008 | Desrochers et al. | |
| 7,389,704 B2 | 6/2008 | Desrochers et al. | |
| 7,398,821 B2 | 7/2008 | Rainer et al. | |
| 7,414,525 B2 | 8/2008 | Costea et al. | |
| 7,415,901 B2 | 8/2008 | Desrochers et al. | |
| 7,434,413 B2 | 10/2008 | Wruck | |
| 7,458,228 B2 | 12/2008 | Lagace et al. | |
| 7,475,828 B2 | 1/2009 | Bartlett et al. | |
| 7,558,648 B2 | 7/2009 | Hoglund et al. | |
| 7,788,936 B2 | 9/2010 | Peterson et al. | |
| 7,798,418 B1 | 9/2010 | Rudd | |
| 7,979,163 B2 | 7/2011 | Terlson et al. | |
| 8,141,373 B2 | 3/2012 | Peterson et al. | |
| 8,364,318 B2 * | 1/2013 | Grabinger et al. | 700/276 |
| 2002/0090908 A1 | 7/2002 | Estepp | |
| 2005/0156051 A1 | 7/2005 | Sanchez | |
| 2007/0205297 A1 | 9/2007 | Finkham et al. | |
| 2007/0218828 A1 * | 9/2007 | Baik | 454/256 |
| 2010/0105311 A1 * | 4/2010 | Meneely, Jr. | 454/239 |
| 2010/0211224 A1 | 8/2010 | Keeling | |
| 2012/0252345 A1 | 10/2012 | Wolfson | |

FOREIGN PATENT DOCUMENTS

| | | |
|---|---|---|
| WO | WO 2005/100870 | 10/2005 |
| WO | WO2007094774 | 8/2007 |

* cited by examiner

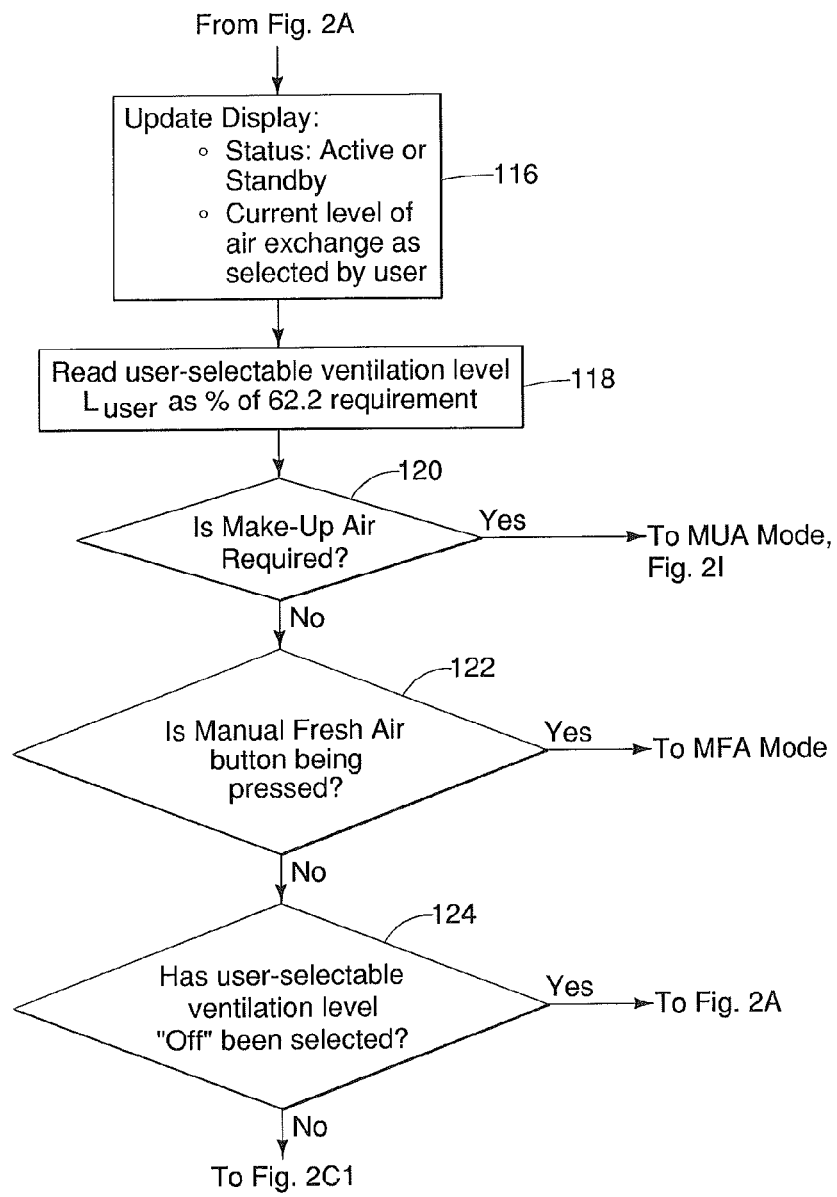

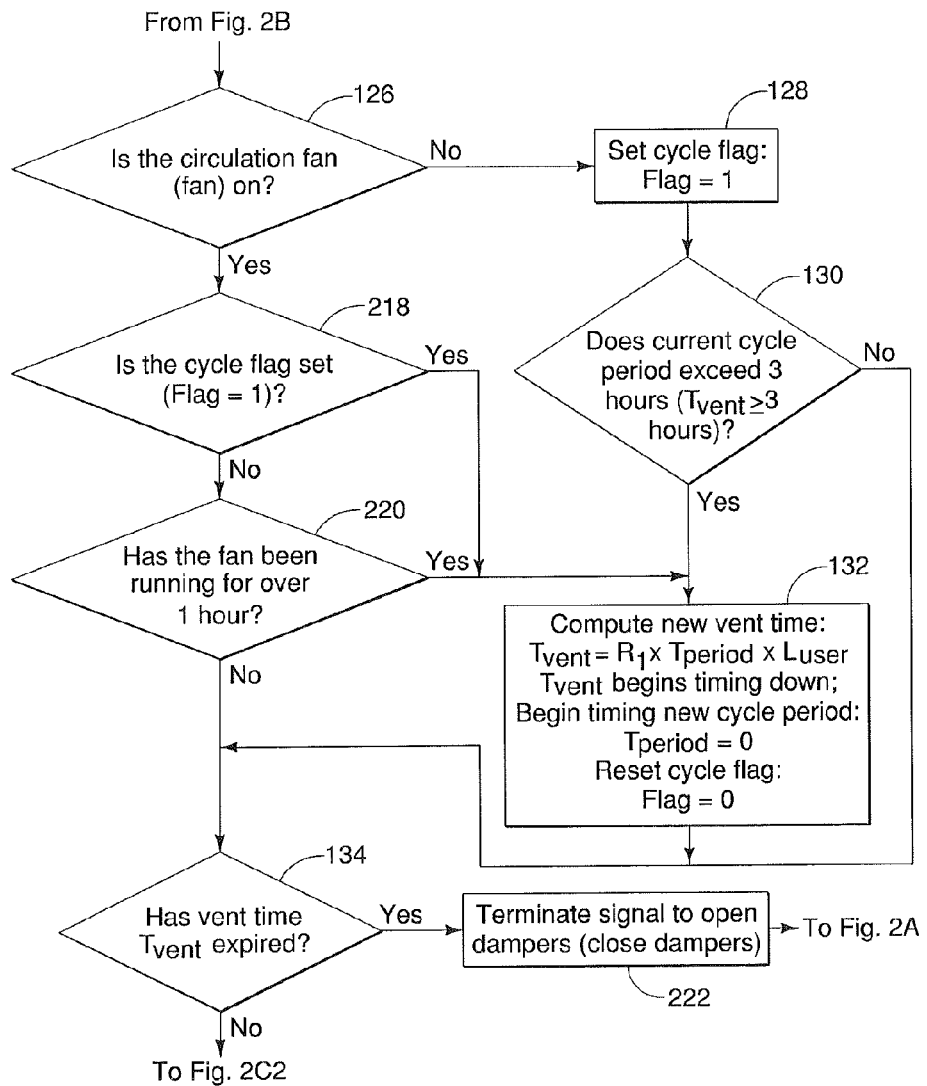
FIG. 2C1

FIG. 2C2
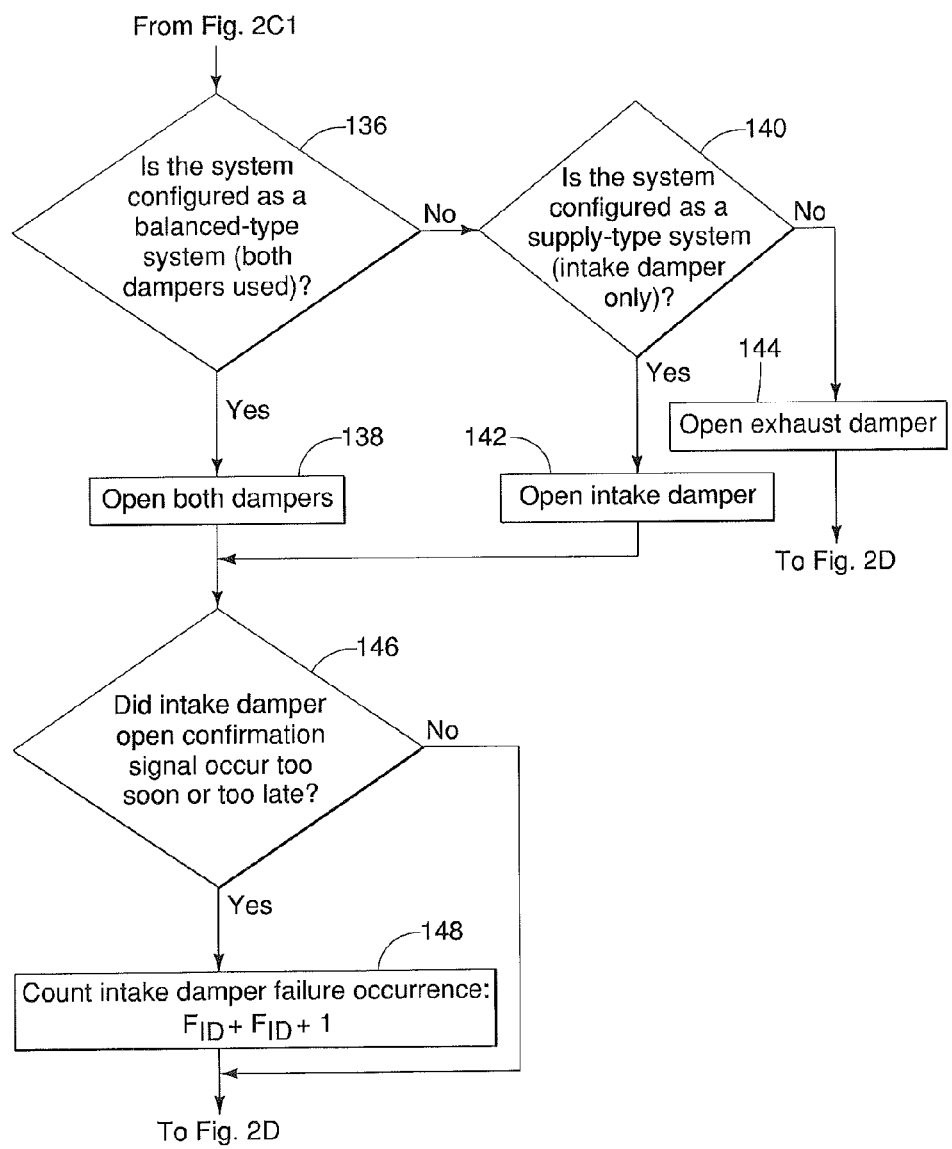

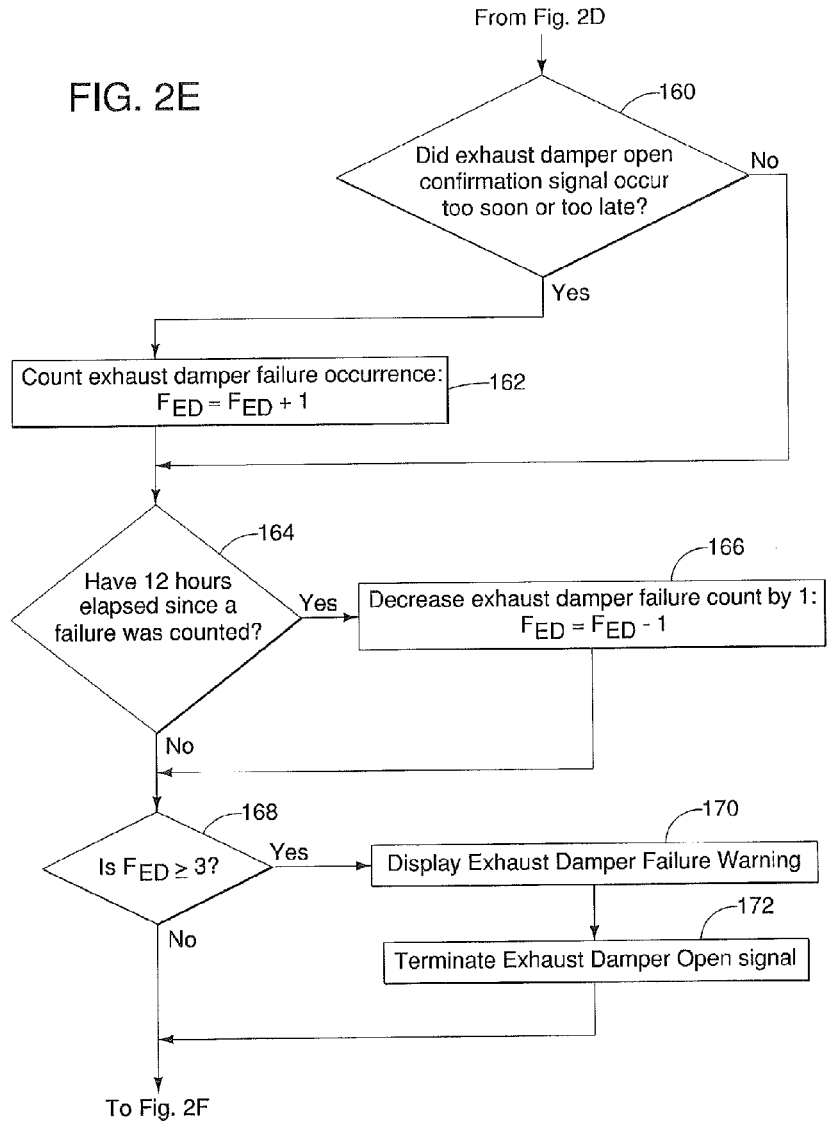

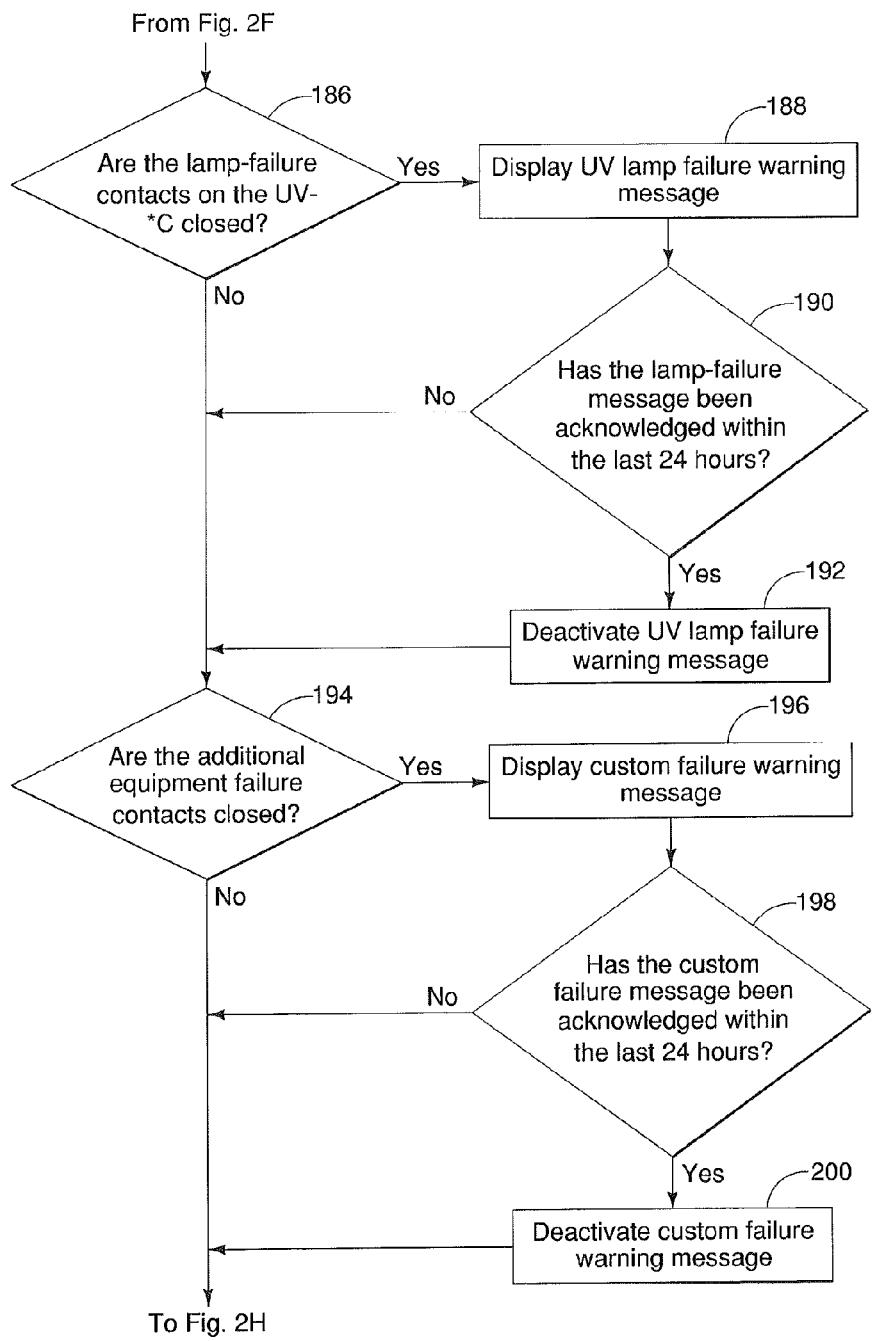

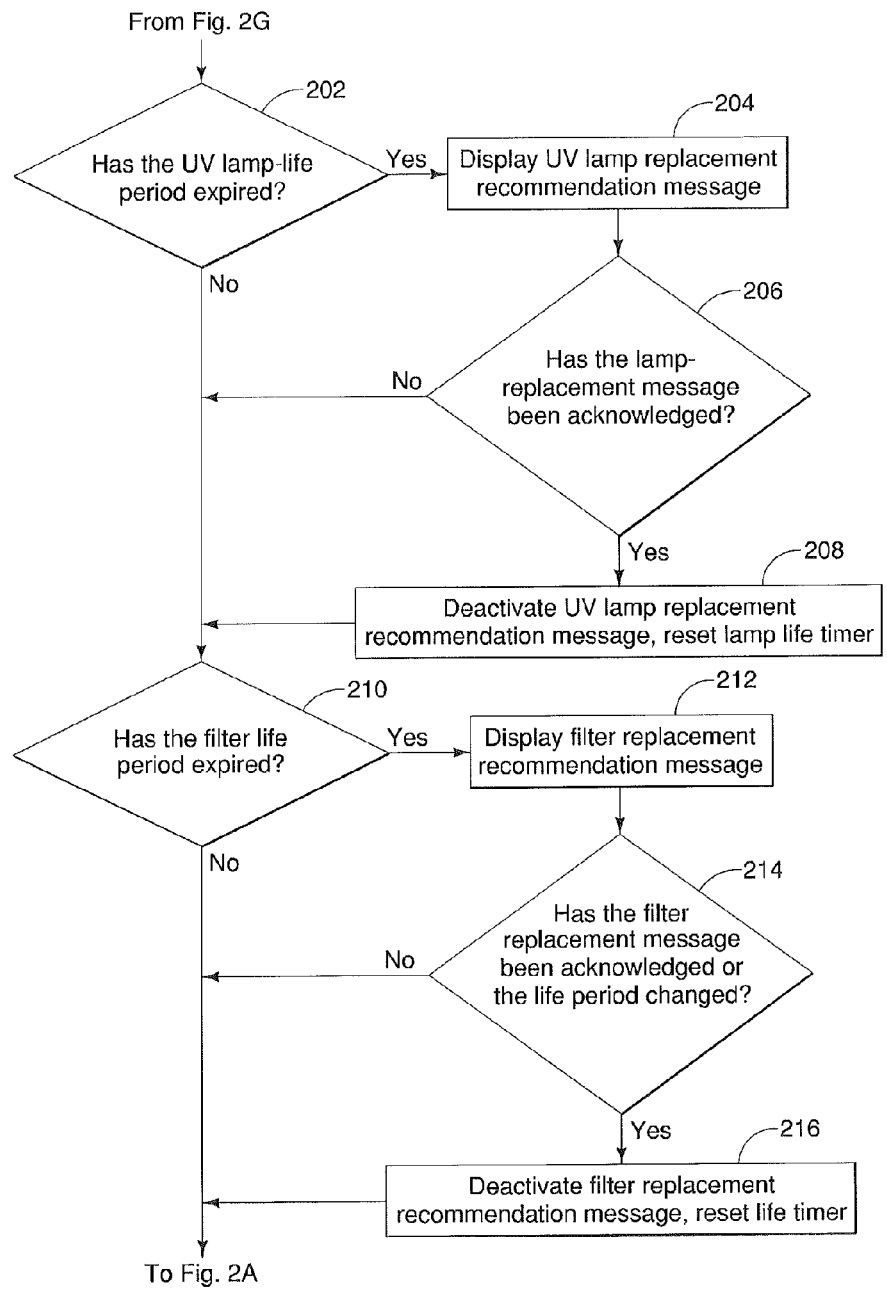

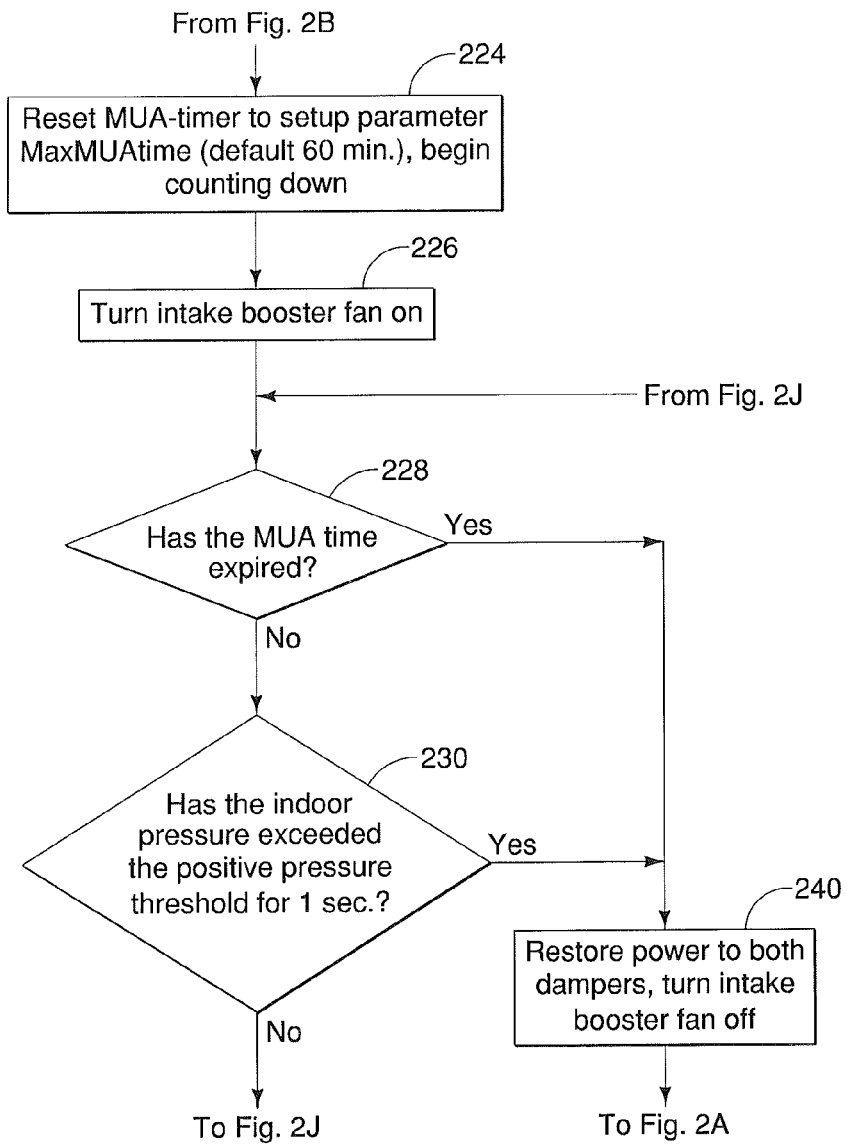

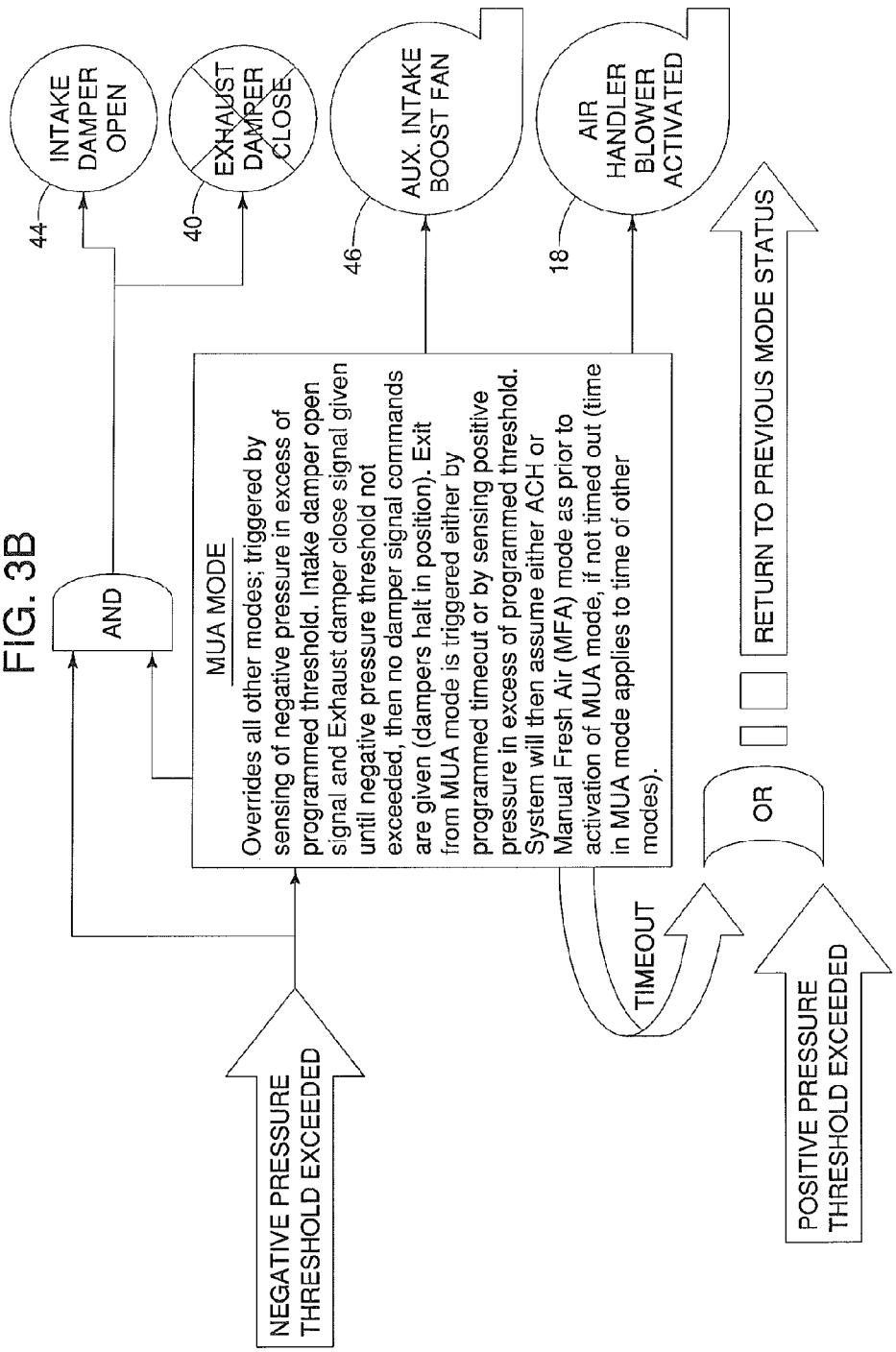

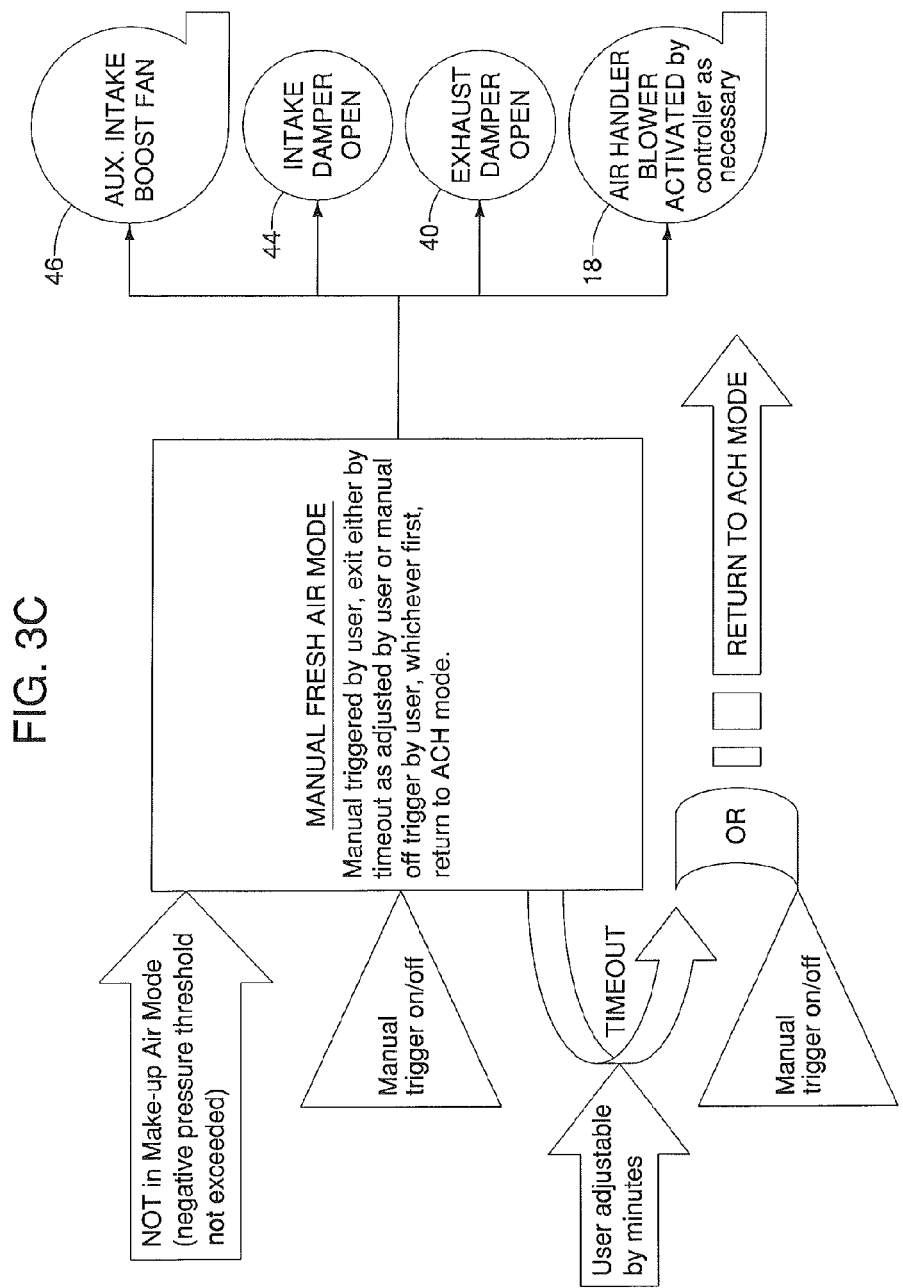

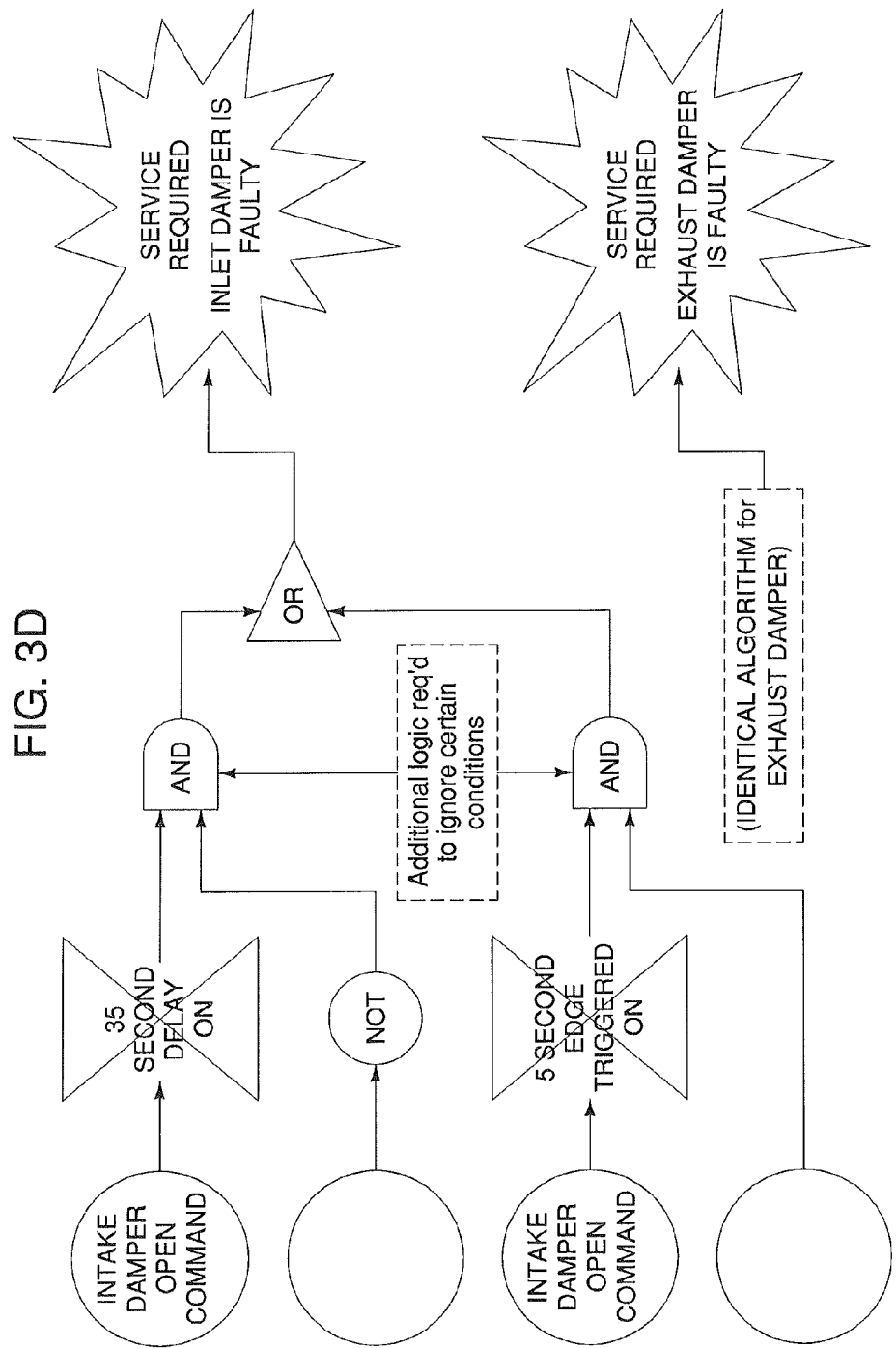

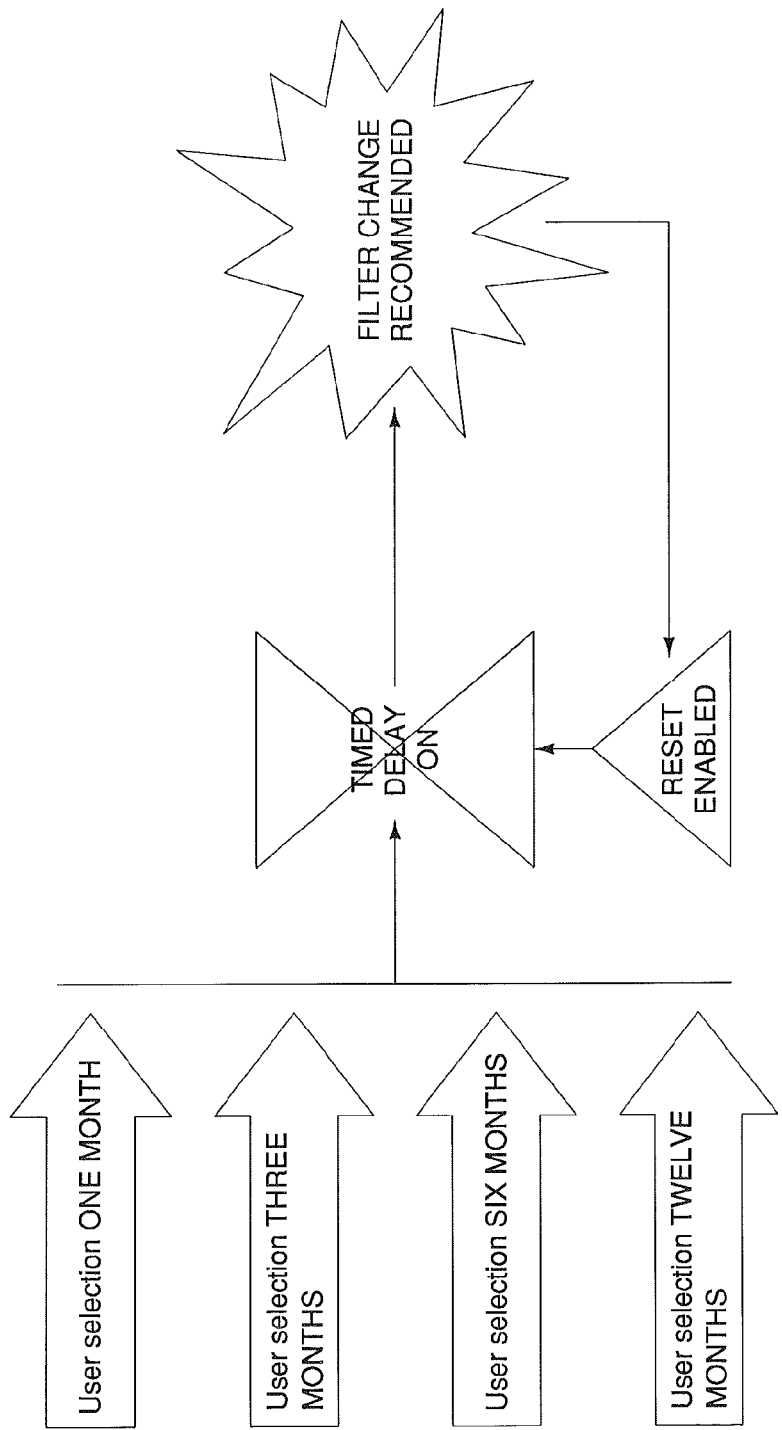

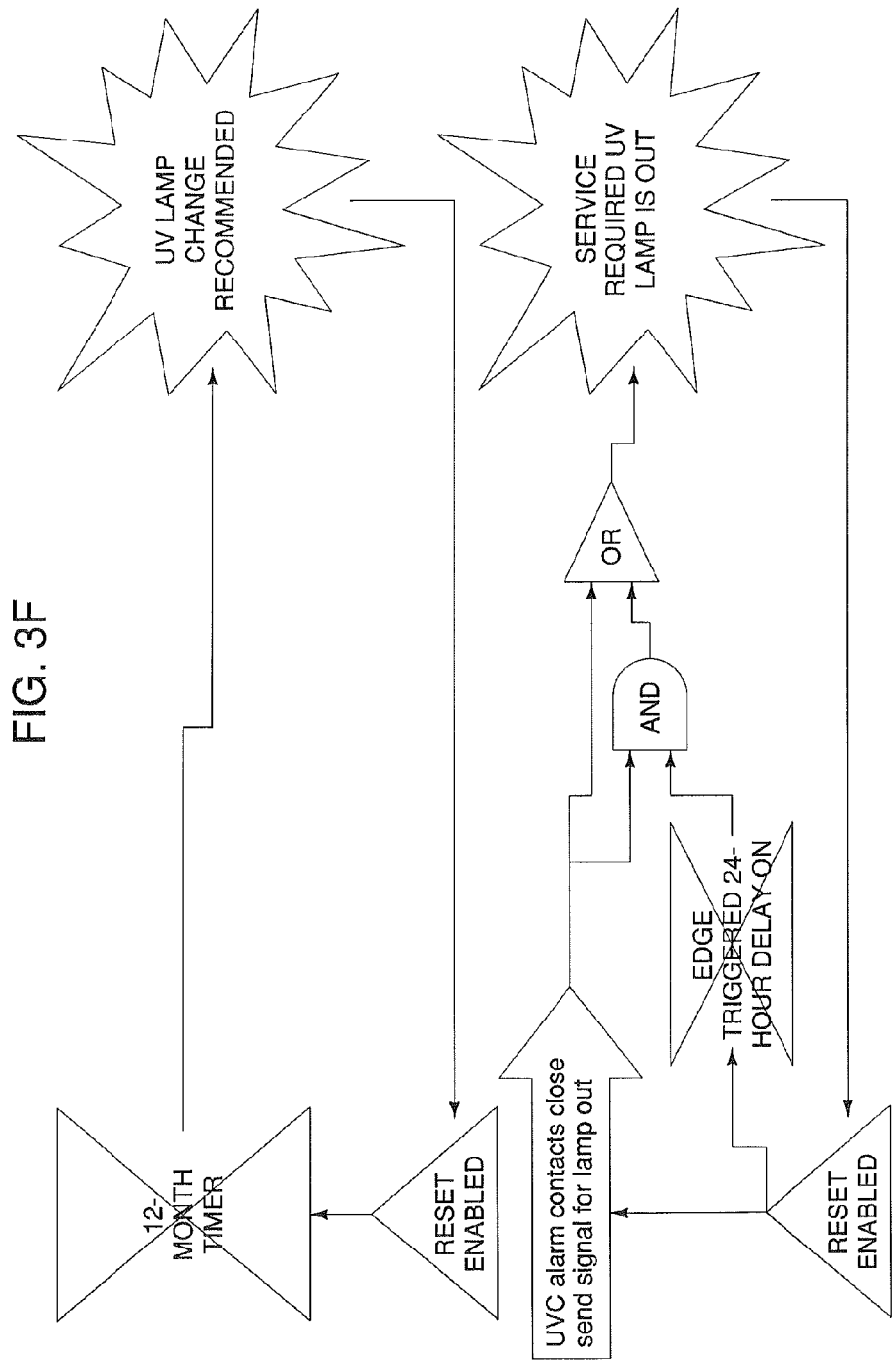

WHOLE HOUSE VENTILATION SYSTEM

CROSS-REFERENCE TO RELATED APPLICATIONS

This application claims priority of provisional application No. 61/390,721,, filed Oct. 7, 2010.

FEDERALLY SPONSORED RESEARCH OR DEVELOPMENT

Not Applicable.

MICROFICHE/COPYRIGHT REFERENCE

Not Applicable.

FIELD OF THE INVENTION

This invention relates to a whole house ventilation system and, more particularly, to a control system therefor.

BACKGROUND

For maintenance of residential indoor air quality, the fresh air flow rates required for the recommended fresh air changes per hour (ACH), based on house size and occupancy level, are prescribed in ASHRAE Standard 62.2, and are given as a theoretical constant rate of fresh air flow replacing outgoing stale air. ACH levels less than the recommendation result in discomfort and building problems, while excessive amounts are uneconomical. Therefore, it is desirable to obtain the prescribed ACH level, and control the fresh air flow rate by means of mechanical ventilation.

Three basic types of fresh air ventilation systems exist: supply-type, consisting of a fresh air intake system only, which tends to pressurize the house, exhaust-type, having only a stale air exhaust system, which tends to depressurize the house, and the balanced-type, having both fresh air intake and stale air exhaust, which tends to maintain a neutral pressure in the house. A balanced type system can also provide the option of employing heat/moisture transfer between the intake and exhaust air streams, by combination with a Heat Recovery Ventilator/Energy Recovery Ventilator (HRV/ERV) or other heat-exchanging device.

The present invention is directed to improvements in whole-house ventilation systems.

SUMMARY

In accordance with the invention, a whole house ventilation control system predicts a cycle of operation duration to achieve desired fresh air flow exchange.

Broadly, there is disclosed in accordance with one aspect of the invention a control system for a whole house ventilation system comprising a house air handling system including a fan, a thermostat, and supply and return air plenums. The thermostat selectively controls the air handling system to maintain desired temperature and resulting in a variable operating cycle period between successive on times. The control system comprises an air exchange duct between one of the plenums and an exterior vent. A controllable damper is in the air exchange duct. A controller is operatively connected to the house air handling system fan and the controllable damper. The controller stores a desired fresh air exchange rate and is further adapted to predict an upcoming cycle period for a next successive operating cycle and calculates a fresh air vent time responsive to the desired fresh air exchange rate and the predicted upcoming cycle. The controller controls the damper to open the damper for the fresh air vent time during the next successive operating cycle.

It is a feature of the invention that the controller includes a user interface and a user can vary the desired fresh air exchange rate.

It is another feature that the controller is adapted to automatically initiate a next successive operating cycle after a select time delay.

It is a further feature that the controller is adapted to automatically shorten a current operating cycle responsive to the air handling system being on for a select length of time.

It is a further feature that the air handling system comprises an HVAC system and wherein the controller is adapted to maintain an HVAC fan energized after the air handling system is turned off responsive to the thermostat for any remaining duration of the fresh air vent time.

It is yet another feature that the air handling system comprises a variable speed fan and the controller is adapted to control the fresh air vent time responsive to actual fan speed.

It is a further feature that the controller is operatively connected to a pressure sensor for sensing return air plenum pressure to determine fan speed.

It is yet another feature that the controller includes a fresh air mode where the controller is adapted to open the damper and energize an air handling system fan responsive to a user command.

There is disclosed in accordance with another aspect a control system for a whole house ventilation system comprising an HVAC system including a fan, a thermostat, and supply and return air plenums. The thermostat selectively controls the HVAC system to maintain desired temperature and resulting in a variable operating cycle period between successive on times. A fresh air intake duct is between an exterior intake vent and the return air plenum. A stale air exhaust duct is between the return air plenum and an exterior exhaust vent. The control system comprises a controllable intake damper in the fresh air intake duct and a controllable exhaust damper in the stale air exhaust duct. A controller is operatively connected to the house HVAC fan and the controllable dampers. The controller stores a desired fresh air exchange rate and is further adapted to predict an upcoming cycle period for a next successive operating cycle and calculating a fresh air vent timer responsive to the desired fresh air exchange rate and the predicted upcoming cycle period. The controller controls the dampers to open at least one of the dampers for the fresh air vent time during the next successive operating cycle.

It is a feature of the invention that the controller includes a make-up air mode to maintain the home at a near neutral pressure wherein the controller is adapted to open the intake damper, close the exhaust damper and energize the HVAC fan in the make-up air mode. The controller may be operatively connected to a pressure sensor for sensing air pressure in the home and wherein the controller is adapted to automatically initiate the make-up air mode responsive to sensed pressure. The controller may be operatively connected to an exhausting device in the home wherein the controller is adapted to automatically initiate the make-up air mode responsive to operation of the exhausting device.

Other features and advantages will be apparent from a review of the entire specification, including the appended claims and drawings.

BRIEF DESCRIPTION OF THE DRAWINGS

FIGS. 2A-2J comprises a flow diagram for an algorithm implemented in the fresh air control of FIG. 1; and FIGS. 3A-3F comprise functional block diagrams for control schemes implemented in the fresh air control of FIG. 1.

DETAILED DESCRIPTION

Figure 1:
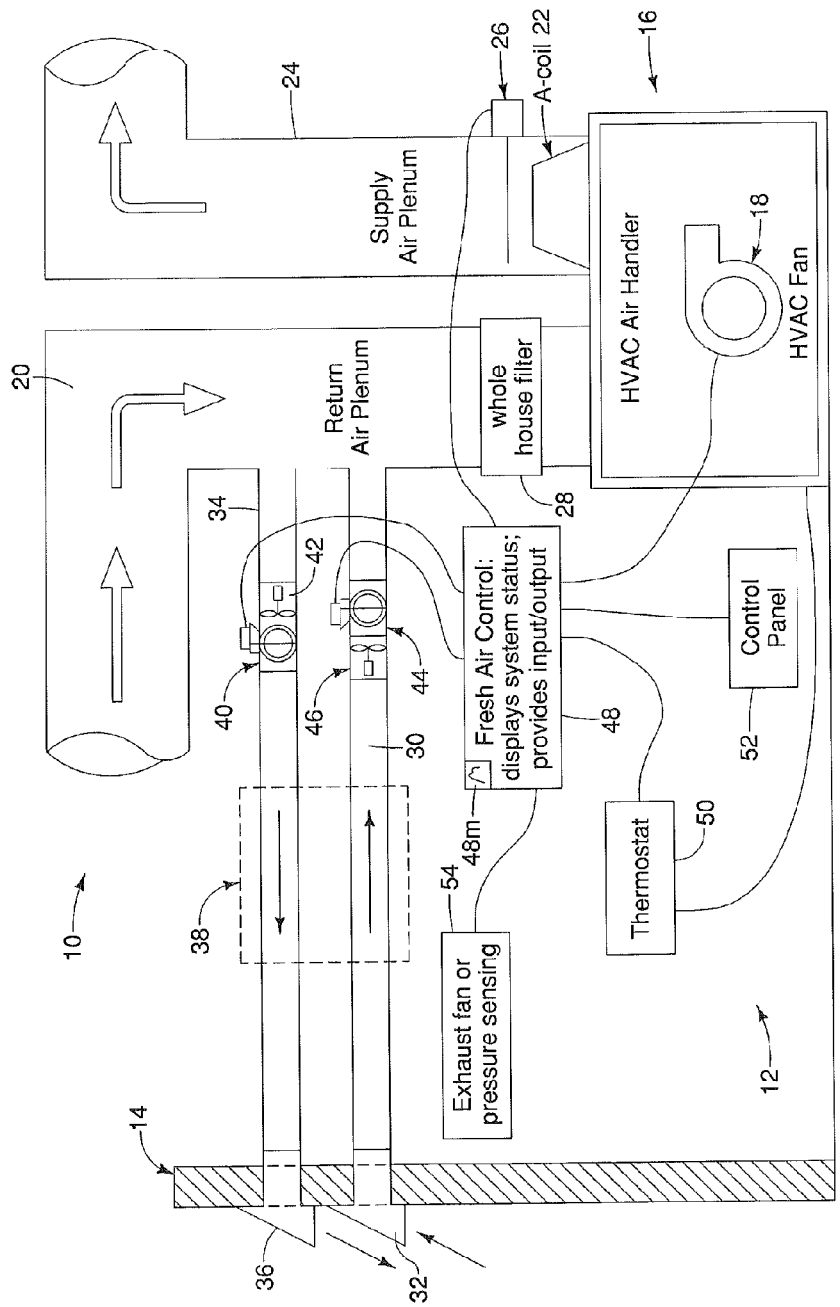
FIG. 1 is a block diagram of a whole house ventilation system in accordance with the invention.

As described herein, a whole house ventilation system is of the balanced type, having both a controlled fresh air inlet damper and controlled stale air exhaust damper and fan. The system may also be configured by the installer as either a supply type or exhaust type system, if so desired in certain climates.

It is permitted under ASHRAE 62.2, to provide the air flow for ACH intermittently. In order to provide the prescribed ACH with an intermittent or "fractional" fresh air system, the fractional fresh air flow rate is also prescribed in ASHRAE 62.2, and states that the intermittent flow rate must be related to the duty cycle of the fresh air system. For example, if the system provides fresh air one third of the time, the flow rate must be three times the prescribed constant-flow rate as given. This allows the implementation of a system that is designed to operate in synchronous fashion with the independent cycling of a typical HVAC system, in response to action of the thermostat. In addition, an installation of this type may make use of existing HVAC system components that are required for heating/cooling, germicidally treating, and distributing the conditioned air. With such a system, the fresh air can be provided when the conditioned air is provided, and mixed with the HVAC system return air prior to filtration, conditioning, treatment and distribution of the air. A fresh air control described herein is programmed to operate in such fashion, in synchronization with the independent cycling of the HVAC system.

In order to account for variation in the HVAC fan cycle period, and control the required ACH level, the control employs an adaptive "learning" control algorithm that essentially predicts the duration of the next entire HVAC fan cycle period (on, to off and back on again), based primarily on the previous cycle period length, and calculates the active fresh air phase duration (how long the system will supply fresh air) for the next cycle, in order to provide the correspondingly correct amount of fresh air. Fresh air is supplied for the fraction of the predicted HVAC cycle period as prescribed by ASHRAE 62.2, with the fraction being the ratio of the theoretical constant-flow rate prescribed, and the measured air flow in the fresh air/stale air ducts as installed. In this way, time is broken into periods as defined by the independent operation of the HVAC system cycles, the corresponding amount of fresh air for a given period is provided, and air changes per hour are thereby controlled, regardless of variations in HVAC cycle period length.

Near the end of an HVAC cycle period, before the HVAC fan is activated again and a new cycle period begins, the fresh air system will typically be in standby, waiting for the thermostat (or occupant action) to cause the HVAC system to come on. When the HVAC fan becomes active again, the fresh air system will simultaneously initiate a new fresh air cycle, providing the precise amount of fresh air to coincide with the predicted length of the new HVAC fan cycle period. Defining the HVAC cycle period in such fashion eliminates gaps in the variable time base of the HVAC cycle periods and allows delivery of the correct amount of fresh air in sync with the HVAC cycles.

In compliance with ASHRAE 62.2, if the HVAC cycle period exceeds three hours, the fresh air system itself will initiate a new HVAC cycle by activating the HVAC circulation fan, to provide the correct amount of fresh air during times of mild outdoor temperatures. Also, the fresh air system can periodically 'divide' the HVAC cycle period, for cases where the HVAC system runs continually (i.e. fan set to "on"), or near continually, due to occupant action or extreme outdoor conditions.

Should the HVAC fan be deactivated by the thermostat before the time for fresh air expires, the fresh air control will continue to energize the HVAC fan for the duration of the required fresh air cycle phase duration.

Because many HVAC systems have multiple or variable speed fans, and the fresh air duct flow would vary with the HVAC fan speed, the control compensates for multiple fan speeds, and provides the correct corresponding amount of fresh air, regardless of fan speed. The control is programmed to recognize plural distinct fan speed levels, and may sense these by means of pressure switches having differing set points that sense distinct levels of return plenum pressure. The calculation of the remaining length of time the fresh air flow is allowed, for the current cycle period, is adjusted in real time throughout the fresh air cycle, by applying the ratio of the base duct flow rate (fan on low speed) to the current duct flow rate that corresponds to the current pressure. Additional speeds or even infinite fan speed variation could be accomplished if the proper means of input to the control were provided, such as measuring the actual duct flow during the fresh air cycle, as will be discussed.

The fresh air ventilation rate is thereby controlled under all conditions, in accordance with ASHRAE 62.2, and operation as such is termed "Automatic Fresh Air Mode".

It is contemplated that the control system could be further enhanced, to compensate for HVAC fan cycle periods significantly longer or shorter than the predicted cycle period, that may be encountered when an occupant readjusts the thermostat manually, a setback thermostat changes its setpoint according to program, or if a door or window is left open, etc. If the cycle period begins to significantly exceed the predicted cycle period, beyond the natural variation expected due to changes in outdoor temperature, the current cycle period can be artificially divided as previously described, which would tend to adjust the corresponding fresh air time gradually over the next cycle period or two. If the cycle period were significantly shorter than expected, the current fresh air time could be truncated and gradually added back over the next few cycles.

The occupants are given a control panel with buttons and a display to indicate system status and provide control over the various modes and features.

A variable ACH control feature is provided for the Automatic Fresh Air mode, whereby the occupants may change the level of ACH as a percentage of the rate prescribed by 62.2, at a push of the up/down buttons while in Automatic Fresh Air Mode. This feature enables the occupants to easily adjust the ACH level to suit their needs, such as when additional air exchange is desired, or if the home is to be unoccupied for a period of time. It is contemplated that the system would return to the rate prescribed by 62.2, ("normal") at the expiration of a programmable period of time; the length of this period could also be adjusted by the occupants.

The Automatic Fresh Air Mode may also be disabled, without disabling other features and modes to be described.

The control also features two other distinct operating modes, besides the Automatic Fresh Air mode previously described: Automatic Make-up Air Mode and Manual Fresh Air mode.

Automatic Make-Up Air Mode: the system also functions as a make-up air system that automatically provides make-up air for exhausting equipment such as clothes dryers, range hoods, and central vacuum systems etc., by bringing in outdoor air while not exhausting stale air, whenever the need is sensed. Providing make-up air prevents depressurization of the home and aids in proper venting of combustion appliances, prevents condensation in exterior walls during high-dew point outdoor conditions, and maximizes functionality of the exhausting devices. Make-up air is increasingly becoming an issue of major concern, especially in northern climates where weatherization of homes tends to be more extreme.

The make-up air feature of the fresh air system also provides the benefits achieved by filtering, treating, and tempering the incoming air by dilution in the system return air. Without such a system, make-up air would be drawn into the home through any and all available openings, such as crawl spaces, and would not be filtered and treated etc.

Automatically providing make-up air can be accomplished either by electrically or mechanically sensing operation of exhausting devices and providing a corresponding amount of make-up air flow for the particular exhausting devices operating at a given time, or by sensing the actual air pressure in the home, and providing the appropriate amount of make-up air to maintain the home at a near-neutral pressure. The control incorporates a pressure transducer to sense house pressure, providing input to the system controller, which actively controls the pressure of the home at all times.

If the pressure sensor senses a negative house pressure exceeding a programmable setpoint, the Automatic Make-up Air mode is triggered, and supersedes any other mode the control may be in at the time.

Control of the net amount of flow of incoming make-up air is accomplished by variable positioning of the fresh air damper (and exhaust air damper if open when the mode is triggered), until a neutral condition is reached. Power-open and power-close unidirectional dampers are used so as the damper gates are moving to full open/full closed they will be halted in a position when a neutral condition is sensed. The system continues to monitor house pressure;, if the negative pressure threshold is reached again, the dampers respond by moving further to full open/fully closed positions until the neutral condition is again reached.

The control is programmed to exit the make-up air mode when either positive pressure is sensed in the house, indicating the exhaust device has ceased operation, or when a pre-set time limit expires, to provide exit from the mode in the case a window or door has been opened. A smoothing function is applied to the pressure transducer input to reduce spurious mode triggering/exiting due to closing/opening of doors etc.

Control output for an optional make-up air boost fan provides additional flow capability, which operates the boost fan only in make-up air mode.

It is also contemplated that if a pressure sensor approach is used, by means of automatically-controlled solenoid valves mounted in a manifold block, the same sensor could also be briefly and periodically ported to a very simple flow-measurement device ('thin-plate orifice') installed in the fresh air duct, to measure and monitor actual duct flow, and eliminate the need for the installer to measure the actual fresh air flow and manually provide that input during setup. The flow sensing could also allow compensation for multiple and even infinite variation in HVAC fan speed by providing fresh air flow information to the control during the fresh air cycle, especially if an additional sensor were added that was dedicated to constant measurement of the fresh air flow.

A thin-plate orifice is simply a section of the duct with an abrupt change to a slightly smaller diameter, and abruptly back to original diameter, and is typically a sheet metal pan fitted into the duct, with a central hole of diameter slightly smaller than the duct diameter. Such a device is maintenance-free, is much less prone to error resulting from dust accumulation, has no moving parts, offers little restriction to air flow, and is extremely inexpensive.

The system also periodically re-zeros the sensor to eliminate possible sensor drift problems.

Manual Fresh Air Mode: the occupant interface of the system also includes a manual override feature; whereby the occupant pushes a button that causes the system to provide fresh air at maximum flow for an adjustable period of time. This feature provides extra fresh air on demand, such as when offensive odors may be present. The period of time is adjustable by up/down button control, with the last time setting being the current default. When either the time period expires, or if the manual fresh air button is pressed again, before the time period expires, the system returns to normal operation in the Automatic Fresh Air Mode.

The system also includes additional features including monitoring of fresh air damper operation, with fault detection having a tolerance of intermittent faulty behavior. If sufficient faultiness is detected in either damper, a service alert is displayed for that particular damper and the damper is given the command to remain closed. Additional features may include filter-change reminder display with occupant-selected time interval; monitoring of a UV air purification system; a service alert is displayed if the bulb burns out; and Yearly UV bulb replacement reminder display. A contemplated additional feature would be an installer-customized service alert message for additional equipment that may have alarm contacts, such as a humidifier etc.

Incoming air will always be greatly tempered, and typically further tempered by active operation of the HVAC system's heating/cooling phase, making pre-treating incoming fresh air unnecessary in most installations. Operation of the ventilation system is virtually unnoticeable to the occupants. Increase in power usage from additional fans is minimized. Damper operation noise is masked by HVAC system operational noise. When the HVAC system rarely runs due to mild outdoor temperatures, the ventilation system will activate periodically, which in effect adds an 'economizer' feature to the HVAC system, which also results in periodic filtration and UV treatment of the indoor air when it otherwise would not occur. Reduced installation cost to homeowner vs. an HRV/ERV. All incoming air is economically filtered and UV-treated before distribution. All incoming air is discharged at normal discharge points and is distributed throughout the household by the HVAC system.

Referring to FIG. 1, a whole house ventilation system 10 includes a whole house ventilation control system 12 according to an exemplary embodiment of the invention. The whole house ventilation system 10 is contained within a house of conventional construction including plural exterior walls one of which 14 is illustrated in the drawing. As is apparent, the term house as used herein could refer to any type of structure or dwelling using air handling systems such as disclosed herein. The whole house ventilation system 10 includes an HVAC system 16 operable to maintain a desired temperature and including an HVAC fan 18. The HVAC system 16 is illustrated by way of example and may comprise different types of air handling systems which provides for heating and/or cooling, as necessary or desired. The particular details of the HVAC system 16 are thus not disclosed in detail herein. The HVAC fan 18 draws air from a return air plenum 20 and delivers air which may be heated, cooled by an A coil 22, or not treated, to a supply air plenum 24. An ultraviolet disinfection system 26 may be included in the supply air plenum 24. A whole house filter 28 may be included in the return air plenum 20.

A fresh air intake duct 30 extends between an exterior intake vent 32 and the return air plenum 20. A stale air exhaust duct 34 extends between the return air plenum 20 and an exterior exhaust vent 36. A heat exchanger 38, such as a Heat Recovery Ventilator/Energy Recovery Ventilator (HRV/ERV), or other heat-exchanging device, may be operatively associated with the ducts 30 and 34. A controllable exhaust damper 40 is positioned in the exhaust duct 34 and may include a fan 42. Similarly, a controllable intake damper 44 is in the fresh air intake duct 30 and may include a boost fan 46. The dampers 40 and 44, and similarly the associated fans 42 and 46, may be of any known construction and are operatively connected to a fresh air control 48. The control 48 selectively controls the dampers 40 and 44 to open or close to allow or restrict air flow in the respective ducts 30 and 34. The fresh air control is also operatively connected to the HVAC fan 18 and to a thermostat 50. The thermostat 50 is also connected to the HVAC system 16. A user control panel 52 is likewise operatively connected to the fresh air control 48 as is an exhaust fan or pressure sensing device represented by a block 54. The pressure sensing device may be for sensing pressure in the return air plenum 20, as discussed above. Alternatively, the exhaust fan may be used to sense the status of an exhaust device for a make-up air mode, as described below.

The HVAC system 16 is independently controlled by the thermostat 50 in a conventional manner to selectively energize a heat source, the A coil 22 and the fan 18 to provide conditioned air to maintain the desired temperature. The fresh air control 48 is operative to control fresh air ventilation also using the HVAC fan 18.

The fresh air control 48 comprises a programmed controller operating in accordance with a control program stored in a memory 48M. The fresh air control 48 displays system status using the control panel 52, and also receives operating commands from the control panel 52. The fresh air control 48 includes appropriate input and output interfaces for the various interconnected devices.

Figure 2A:
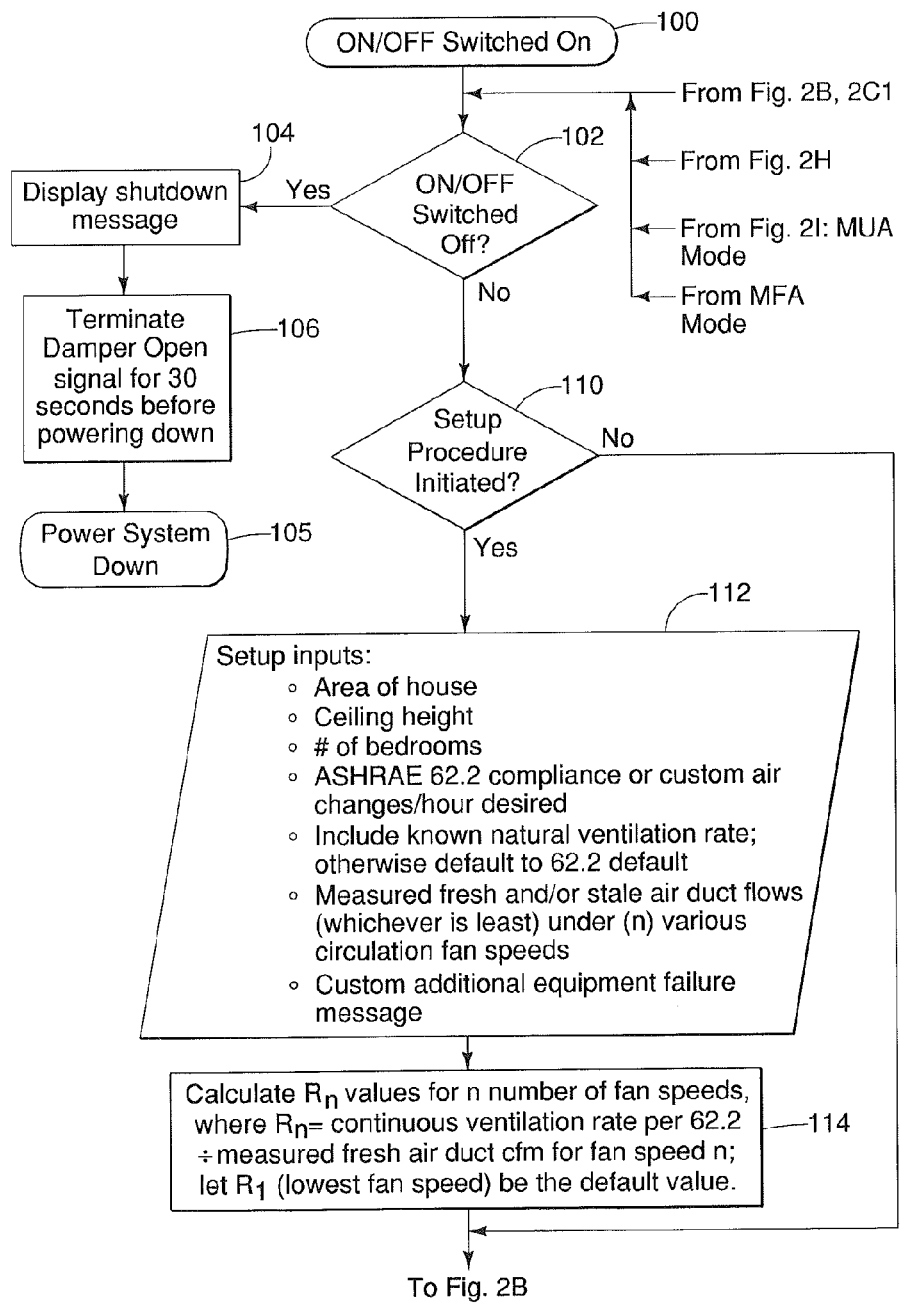
Figure 2D:
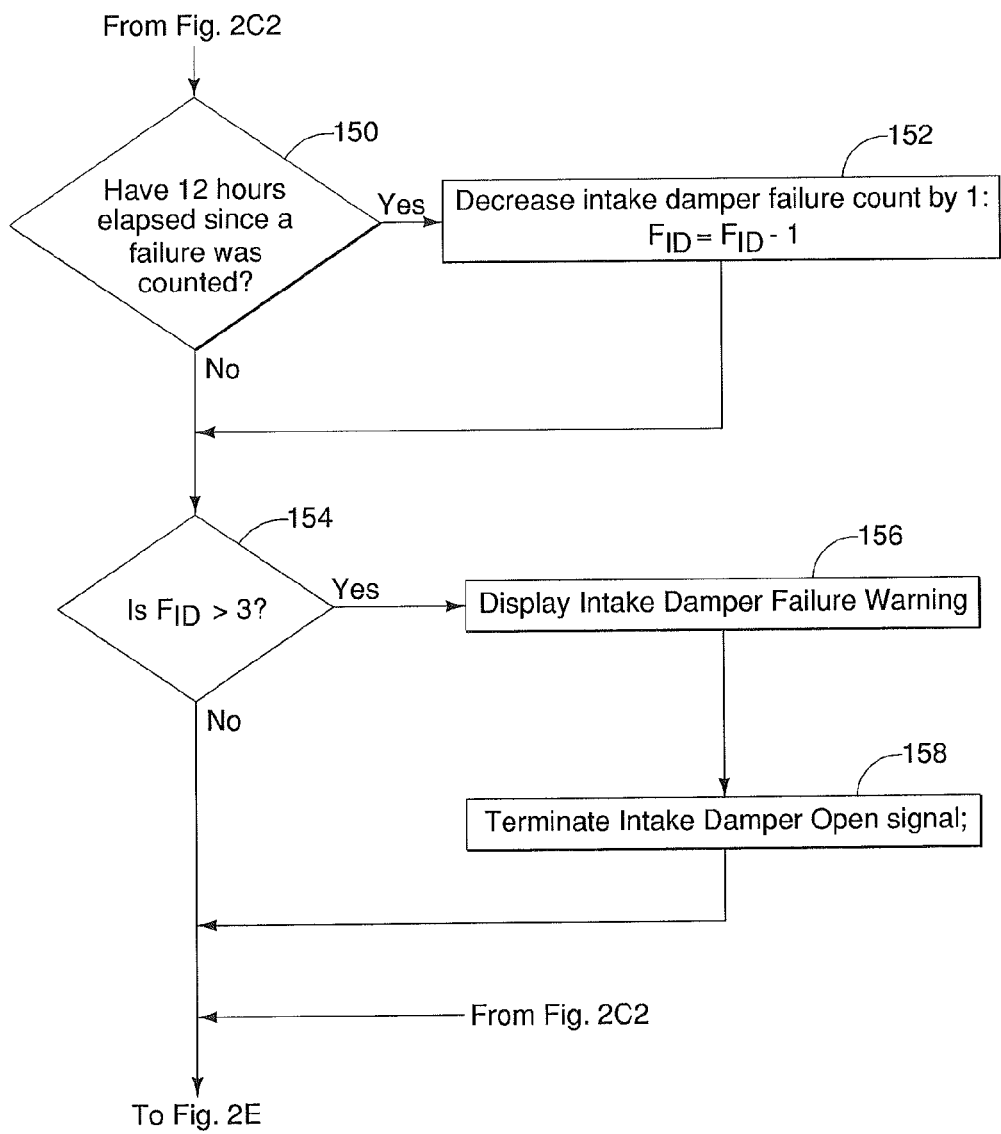
Figure 2F:
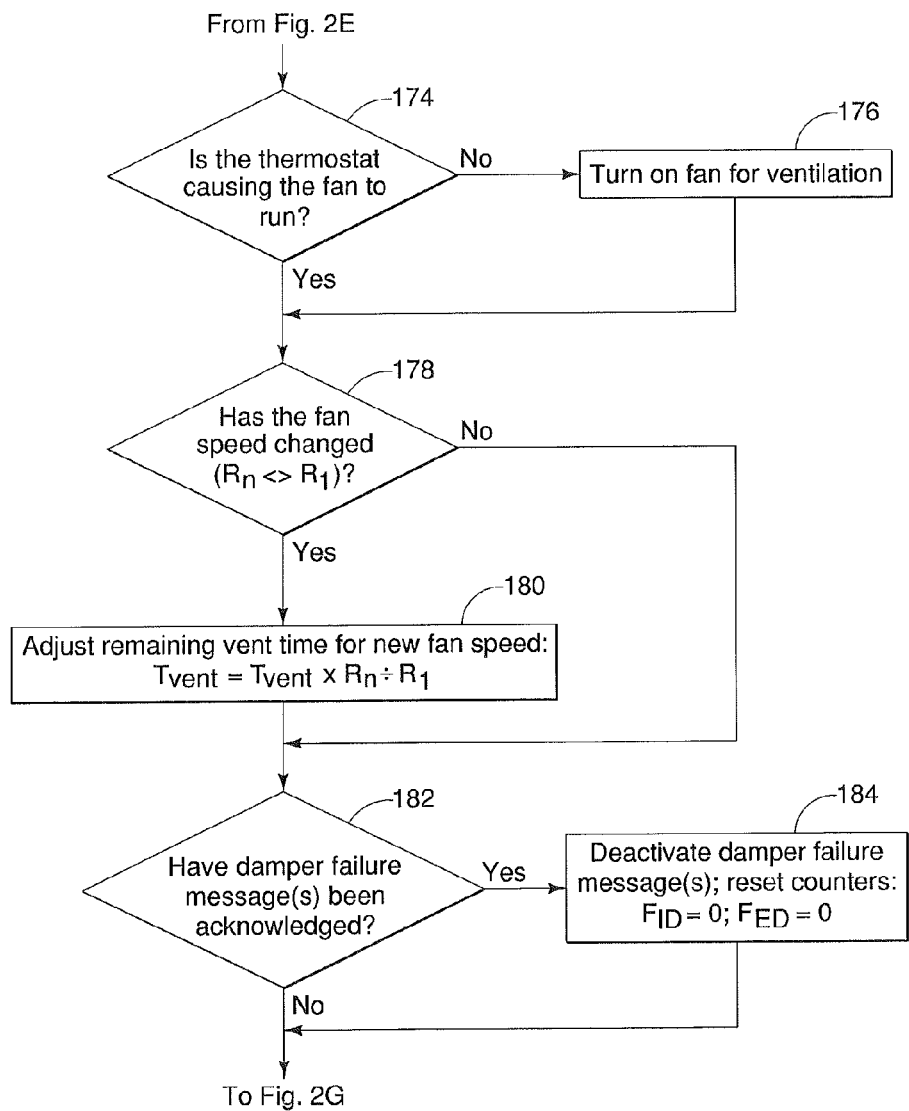
Figure 2J:
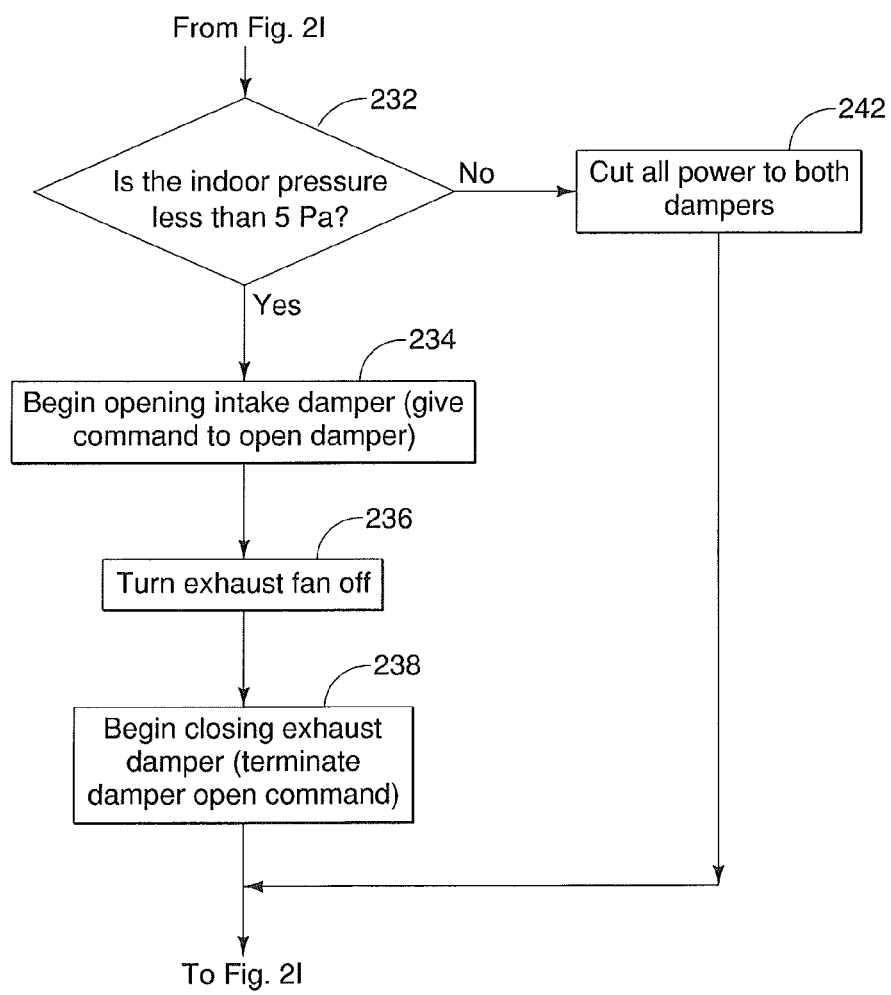

FIGS. 2A-2J illustrate a flow diagram for a control program stored in the memory 48M and implemented by the fresh air control 48. Referring initially to FIG. 2A, the program begins when the control system 12 is switched on at a node 100. A decision block 102 determines whether or not the control 48 has been switched off. If so, then a shut down message is displayed at a block 104 and a terminate damper open signal is provided to the dampers 40 and 44 for 30 seconds to close the dampers. The system 102 is then powered down at a block 108. If the system is not switched off, as determined at the decision block 102, then a decision block 110 determines whether or not to initiate a set up procedure. This will occur when the control system 12 is first turned on. If so, then a set up input function is implemented at a block 112. This loads various parameters from memory including area of house, ceiling height, number of bedrooms, ASHRAE 62.2, compliance or custom air changes per hour desired, known natural ventilation rate, measured fresh and/or stale air duct flows for various fan circulation speeds and custom additional equipment failure. At a block 114, the program calculates a ventilation rate $R_n$, for each fan speed. The value $R_n$, represents a desired fresh air exchange rate. The value $R_n$, is equal to the continuous ventilation rate for ASHRAE 62.2, divided by the measured fresh air duct CFM for the particular fan speed. A default value $R_1$, is used for the lowest fan speed.

From the block 114, or if the set up procedure is not being initiated at the block 110, then the program advances to FIG. 2B and a block 116 which updates the display on the control panel 52 to indicate the status as Active or Standby. The control panel 52 also displays a current level $L_{user}$ of air exchange as selected by the user. The fresh air control 48 is in an Active mode if fresh air is being supplied and is in a Standby mode after the controller has satisfied the necessary fresh air exchange for the current operating cycle. The user can adjust or vary the ventilation level as a percentage of the ASHRAE 62.2, requirement and this value $L_{user}$ is read at a block 118. A decision block 120 then determines if a make-up air mode is required. If not, then a decision block 122 determines if a manual fresh air button on the control panel 52 is being pressed. If not, then a decision block 124 determines if the user-selectable ventilation level feature has been set to off. If so, then the control returns to the decision block 102. If not, then the program proceeds to FIG. 2C1 and a decision block 126 which determines if the HVAC circulation fan 18 is on. As noted above, the fan 18 is also controlled by the HVAC system 16, using the thermostat 50, to appropriately condition air in the house. If not, then a block 128 sets a cycle flag to 1. A decision block 130 determines if the current operating cycle period exceeds 3, hours. If so, then a new operating cycle will begin at a block 132 which computes a new fresh air vent time $T_{vent}$, which is equal to $R_1 \times T_{period} \times L_{user}$. $T_{period}$, is the operating cycle period for the previous operating cycle. In accordance with the invention, the fresh air control 48 predicts duration of the next operating cycle period based on the duration of the previous operating cycle. This value is used to determine length of fresh air venting for the next operating cycle using the fresh air exchange rate $R_1$. The value $L_{user}$ is the user selectable ventilation level which can adjust the duration of fresh air venting for the next operating cycle. The next successive operating cycle then begins. The value $T_{period}$ is set to zero and the cycle flag is reset to 0. The vent time $T_{vent}$ begins to time down. The program then proceeds to a decision block 134 which determines if the vent time $T_{vent}$ has expired. If not, then referring to FIG. 2C2, a decision block 136 determines if the system is configured as a balance type system. If so, then both dampers 40 and 44 are opened at a block 138. If the system is not balanced, then a decision block 140 determines if the system is configured as a supply type system. If so, then the intake damper 44 is opened at a block 142. If not, then the exhaust damper is opened at a block 144 and the program proceeds to a block 160 of FIG. 2E, discussed below. From the blocks 138 or 142 a decision block 146 determines if the intake damper provided an open confirmation signal occurred too soon or too late. If so, then a failure occurrence is incremented at a block 148. Thereafter, or if not, or from the block 144, the program advances to FIG. 2D and a decision block 150.

The decision block 150 determines if 12, hours have elapsed since a failure was counted. If so, then the intake damper failure count is decremented at a block 152. Thereafter, a decision block 154 determines if the failure count is greater than or equal to 3. If so, then an intake damper failure warning is displayed at a block 156 and the intake damper open signal is terminated at a block 158.

Thereafter, or if the failure occurrence is not greater than or equal to 3, at the decision block 154, then the program advances to FIG. 2E and a decision block 160.

The decision block 160 determines if the exhaust damper open confirmation signal occurred too soon or too late. If so, then a failure occurrence count is incremented at a block 162. Thereafter, a decision block 164 determines if 12, hours have elapsed since a failure was counted. If so, then the count is decremented by 1 at a block 166. Thereafter, a decision block 168 determines, if the count is greater than or equal to 3. If so, then an exhaust damper failure warning is displayed at a block 170 and the exhaust damper open signal is terminated at block 172. Thereafter, the program proceeds to FIG. 2F and a decision block 174.

The decision block 174 determines if the thermostat 50 is calling for the fan 18 to run. If not, such as the desired temperature having been reached, then the fan 18 is turned on, or maintained on, for ventilation at a block 176. Thereafter, a decision block 178 determines if the fan speed has changed. If so, then the remaining vent time $T_{VENT}$ is adjusted for the new fan speed by multiplying the remaining vent time $T_{VENT}$ by $R_n/R_1$, at a block 180, where $R_n$, is the desired fresh air exchange rate for the current fan speed. A decision block 182 then determines if any damper failure messages have been acknowledged. If so, then the messages are deactivated and the counter reset at a block 184.

The program then advances to FIG. 2G and a decision block 186 which determines if the lamp failure contacts on the UV system 26 are closed. If so, then the UV lamp failure warning message is displayed at a block 188. A decision block 190 determines if the message has been acknowledged within the last 24 hours. If so, then the message is deactivated at a block 192. Otherwise, a decision block 194 determines if there are additional equipment failure contacts closed. If so, then a custom failure warning message is displayed at a block 196 and a decision block 198 determines if the message has been acknowledged within the last 24 hours. If so, then it is deactivated at a block 200. Thereafter, and advancing to FIG. 2H, a decision block 202 determines if the UV lamp life period is expired. If so, then a replacement recommendation message is displayed at a block 204 and a decision block 206 determines if the message has been acknowledged. If so, then the message is deactivated at a block 208. Also, a lamp life timer is reset. Thereafter, a decision block 210 determines if the filter life period is expired. If so, then a recommendation message is displayed at a block 212. A decision block 214 determines if the message has been acknowledged or the life period changed. If so, then the message is deactivated at a block 216 and the life timer is reset. Thereafter, the program returns to FIG. 2A and the block 102, discussed above.

Returning to FIG. 2C1, if the fan 18 is on, such as due to a continuing call for heating or cooling by the thermostat 50, as determined at the decision block 126, then a decision block 218 determines if the cycle flag is set to 1. If so, then the program proceeds to the block 132 to begin the new cycle. If not, then a decision block 220 determines if the fan has been running for over one hour. If so, then the program goes to the block 132 to begin the new cycle. If not, then the program advances to the block 134, discussed above. If at the block 134, the vent time $T_{vent}$ has expired, then a block 222 terminates the signal to open the dampers 40 and 44, thus closing both dampers. The program then returns to FIG. 2A and the block 102.

Returning to FIG. 2B if the make-up air mode is required based on a negative pressure in the house, as determined by the exhaust fan or pressure sensing at the block 54, see FIG. 1, as determined at the block 120, then the control program begins a make-up air mode, see FIG. 2I. This mode begins at a block 224 which resets a make-up air timer based on a set up maximum time and begins counting down. The intake booster fan 46 is turned on at a block 226. A decision block 228 determines if the MUA timer has expired. If not, then a decision block 230 determines if the indoor pressure has exceeded the positive pressure threshold for at least one second. If not, then a decision block 232, see FIG. 2J, determines if the indoor pressure is less than 5 Pa. If so, then the program begins opening the intake damper 44 at a block 234 and turns the exhaust fan 42 off at a block 236. A block 238 begins closing the exhaust damper 40 by terminating the damper open command. The control then loops back to the block 228. From the block 228, if the timer has expired, or if the indoor pressure has exceeded the positive pressure threshold has determined that the block 230, then a block 240 restores power to both dampers 40 and 44 so that both open and the intake booster fan 46 is turned off. The program then returns to block 102 of FIG. 2A. From the block 232, if the indoor pressure is not less than 5 Pa, then power is cut to both dampers 40 and 44 at a block 242 causing both dampers to close.

FIGS. 3A-3F comprise functional block diagrams illustrating the various modes of operation discussed above and controls of the related devices by the fresh air control 48.

Figure 3A:
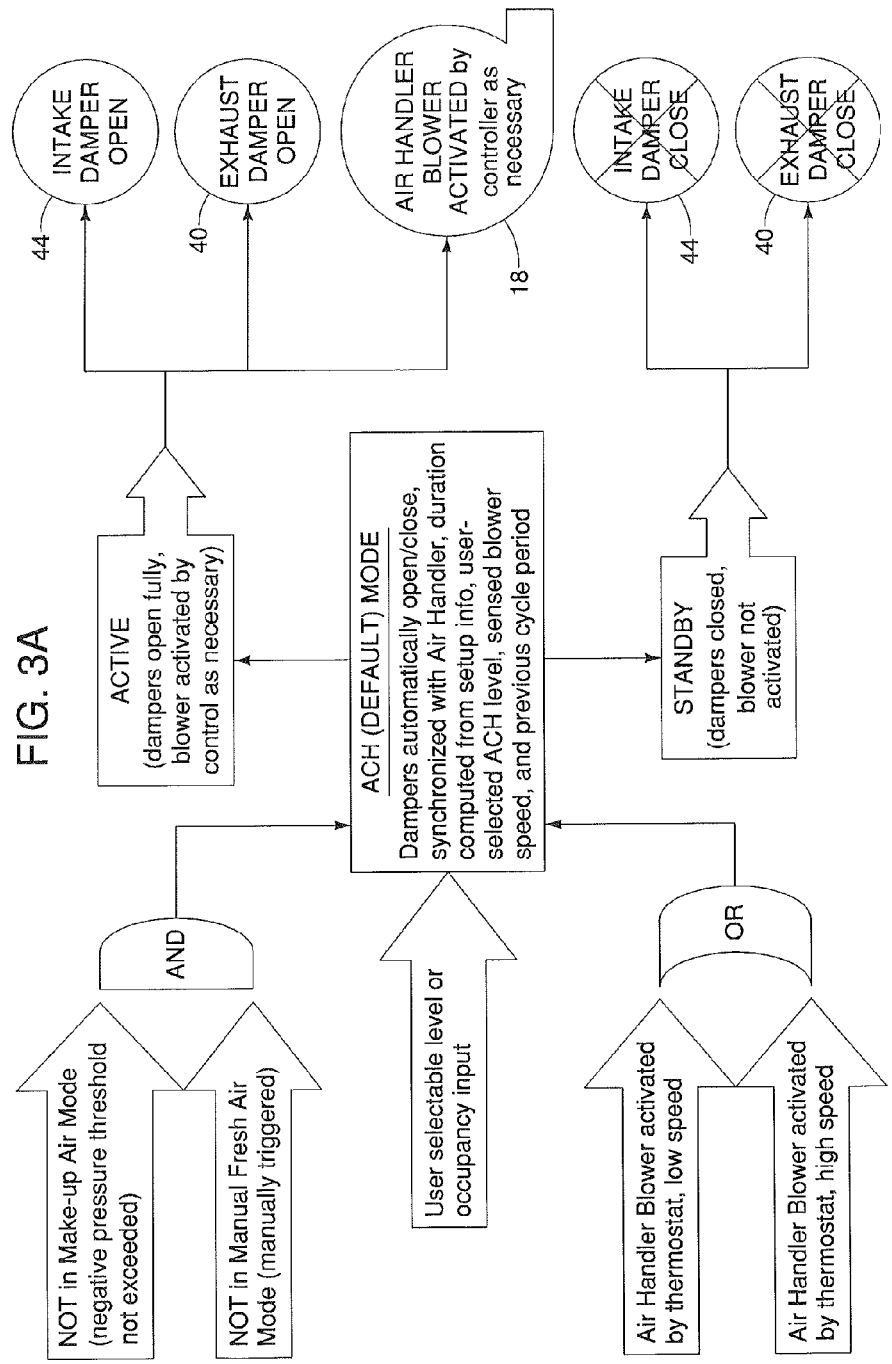

FIG. 3A illustrates the air change per hour (ACH) mode which is the default mode. This is used when the controller is not in the make-up air mode or manual fresh air mode. The air handler blower fan 18 is generally activated by the thermostat 50 in a conventional manner at a low speed or a high speed, as necessary. In the Active mode, where fresh air exchange is called for, the dampers 40 and/or 44 and the fan 18 are controlled as discussed above to satisfy the selected ACH level. In the Standby mode, after the desired ACH level has been satisfied for the current operating cycle, the dampers 40 and 44 are closed and the blower 18 is not activated by the fresh air control 48.

FIG. 3B illustrates the make-up air mode such as when a negative pressure threshold is exceeded. The intake damper 44 is open and the exhaust damper 40 is closed. The intake boost fan 46 and the air handler blower 18 are both activated. This is maintained until the positive pressure threshold is exceeded or the mode times out. The controller then returns to the previous mode status.

FIG. 3C illustrates the manual fresh air mode. This is triggered by a user selecting the mode using the control panel 52 and cannot occur when in the make-up air mode. The mode can be terminated by the user or by a select time out. This mode includes both dampers 40 and 44 being opened and the intake boost fan 46 turned on and the air handler blower 18 activated as necessary.

FIG. 3D illustrates the logic for providing warning messages for the inlet and exhaust dampers whereby an open signal is not received when the particular damper is commanded open. FIG. 3E illustrates display of a filter change recommended message after a user selected filter change period has expired. FIG. 3F illustrates logic for displaying warning messages for changing the UV lamp or servicing the UV lamp, as discussed above.

Thus, in accordance with the invention, there is described a whole house ventilation system which determines a fresh air vent time by predicting a cycle period. The controller also includes a make-up air mode and fresh air mode.

The present invention has been described with respect to flowcharts and block diagrams. It will be understood that each block of the flowchart and block diagrams can be implemented by computer program instructions. These program instructions may be provided to a processor to produce a machine, such that the instructions which execute on the processor create means for implementing the functions specified in the blocks. The computer program instructions may be executed by a processor to cause a series of operational steps to be performed by the processor to produce a computer implemented process such that the instructions which execute on the processor provide steps for implementing the functions specified in the blocks. Accordingly, the illustrations support combinations of means for performing a specified function and combinations of steps for performing the specified functions. It will also be understood that each block and combination of blocks can be implemented by special purpose hardware-based systems which perform the specified functions or steps, or combinations of special purpose hardware and computer instructions.

It will be appreciated by those skilled in the art that there are many possible modifications to be made to the specific forms of the features and components of the disclosed embodiments while keeping within the spirit of the concepts disclosed herein. Accordingly, no limitations to the specific forms of the embodiments disclosed herein should be read into the claims unless expressly recited in the claims. Although a few embodiments have been described in detail above, other modifications are possible. For example, the logic flows depicted in the figures do not require the particular order, shown, or sequential order, to achieve desirable results. Other steps may be provided, or steps may be eliminated, from the described flows, and other components may be added to, or removed from, the described systems. Other embodiments may be within the scope of the following claims.

The invention claimed is:

1. A control system for a whole house ventilation system comprising a house air handling system including a fan, a thermostat, and supply and return air plenums, the thermostat selectively controlling the air handling system to maintain desired temperature and resulting in a variable HVAC operating cycle period between successive on times of the fan, where a fresh air vent time is an adaptable duration value, the control system comprising:
   an air exchange duct between one of the plenums and an exterior vent;
   a controllable damper in the air exchange duct; and
   a controller operatively connected to the house air handling system fan and the controllable damper, the controller storing a desired fresh air exchange rate, wherein the controller predicts duration of the next operating cycle period based on the duration of the previous operating cycle,
   wherein the operating cycle period is defined as ranging from on to off and back on again,
   wherein the value for the predicted duration of the next operating cycle period is calculated and recorded,
   wherein this recorded value for the predicted duration of the next operating cycle period is used as part of a formula to determine length of the fresh air vent time for the next successive operating cycle using the fresh air exchange rate, and
   wherein the controller controls the damper to open the damper for the fresh air vent time during the next successive operating cycle.

2. The control system of claim 1 wherein the controller includes a user interface and a user can vary the desired fresh air exchange rate.

3. The control system of claim 1 wherein the controller is adapted to automatically initiate a next successive operating cycle after a select time delay.

4. The control system of claim 1 wherein the controller is adapted to automatically shorten a current operating cycle responsive to the air handling system being on for a select length of time.

5. The control system of claim 1 wherein the air handling system comprises an HVAC system and wherein the controller is adapted to maintain an HVAC fan energized after the air handling system is turned off responsive to the thermostat for any remaining duration of the fresh air vent time.

6. The control system of claim 1 wherein the air handling system comprises a variable speed fan and the controller is adapted to control the fresh air vent time responsive to actual fan speed.

7. The control system of claim 6 wherein the controller is operatively connected to a pressure sensor for sensing return air plenum pressure to determine fan speed.

8. The control system of claim 1 wherein the controller includes a fresh air mode wherein the controller is adapted to open the damper and energize an air handling system fan responsive to a user command.

9. The control system of claim 1 wherein the fresh air exchange rate comprises an average fresh air exchange rate.

10. The control system of claim 1, wherein the fresh air vent time is calculated as a default value for a lowest fan speed, multiplied by an operating cycle period for a previous operating cycle, multiplied by a current level of air exchange as selected by a user.

11. A control system for a whole house ventilation system comprising an HVAC system including a fan, a thermostat, and supply and return air plenums, the thermostat selectively controlling the HVAC system to maintain desired temperature and resulting in a variable HVAC operating cycle period between successive on times of the fan, where a fresh air vent time is an adaptable duration value, the control system comprising:
   a fresh air intake duct between an exterior intake vent and the return air plenum;
   a stale air exhaust duct between the return air plenum and an exterior exhaust vent;
   a controllable intake damper in the fresh air intake duct;
   a controllable exhaust damper in the stale air exhaust duct; and
   a controller operatively connected to the house HVAC fan and the controllable dampers, the controller storing a desired fresh air exchange rate, wherein the controller predicts duration of the next operating cycle period based on the duration of the previous operating cycle,
   wherein the operating cycle period is defined as ranging from on to off and back on again,
   wherein the value for the predicted duration of the next operating cycle period is calculated and recorded,
   wherein this recorded value for the predicted duration of the next operating cycle period is used as part of a formula to determine length of the fresh air vent time for the next successive operating cycle using the fresh air exchange rate, and
   wherein the controller controls the dampers to open at least one of the dampers for the fresh air vent time during the next successive operating cycle.

12. The control system of claim 11 wherein the controller includes a user interface and a user can vary the desired fresh air exchange rate.

13. The control system of claim 11 wherein the controller is adapted to automatically initiate a next successive operating cycle after a select time delay.

14. The control system of claim 11 wherein the controller is adapted to automatically shorten a current operating cycle responsive to the air handling system being on for a select length of time.

15. The control system of claim 11 wherein the controller is adapted to maintain the HVAC fan energized after the HVAC system is turned off responsive to the thermostat for any remaining duration of the fresh air vent time.

16. The control system of claim 11 wherein the HVAC system comprises a variable speed HVAC fan and the controller is adapted to control the fresh air vent time responsive to actual .HVAC fan speed.

17. The control system of claim 16 wherein the controller is operatively connected to a pressure sensor for sensing return air plenum pressure to determine fan speed.

18. The control system of claim 11 wherein the controller includes a fresh air mode wherein the controller is adapted to open the dampers and energize an air handling system fan responsive to a user command.

19. The control system of claim 11 wherein the controller includes a make-up air mode to maintain the home at a near neutral pressure wherein the controller is adapted to open the intake damper, close the exhaust damper and energize the HVAC fan in the make-up air mode.

20. The control system of claim 19 wherein the controller is operatively connected to a pressure sensor for sensing air pressure in the home and wherein the controller is adapted to automatically initiate the make-up air mode responsive to sensed pressure.

21. The control system of claim 19 wherein the controller is operatively connected to an exhausting device in the home and wherein the controller is adapted to automatically initiate the make-up air mode responsive to operation of the exhausting device.

22. The control system of claim 11 wherein the fresh air exchange rate comprises an average fresh air exchange rate.

* * * * *